Figure 4:
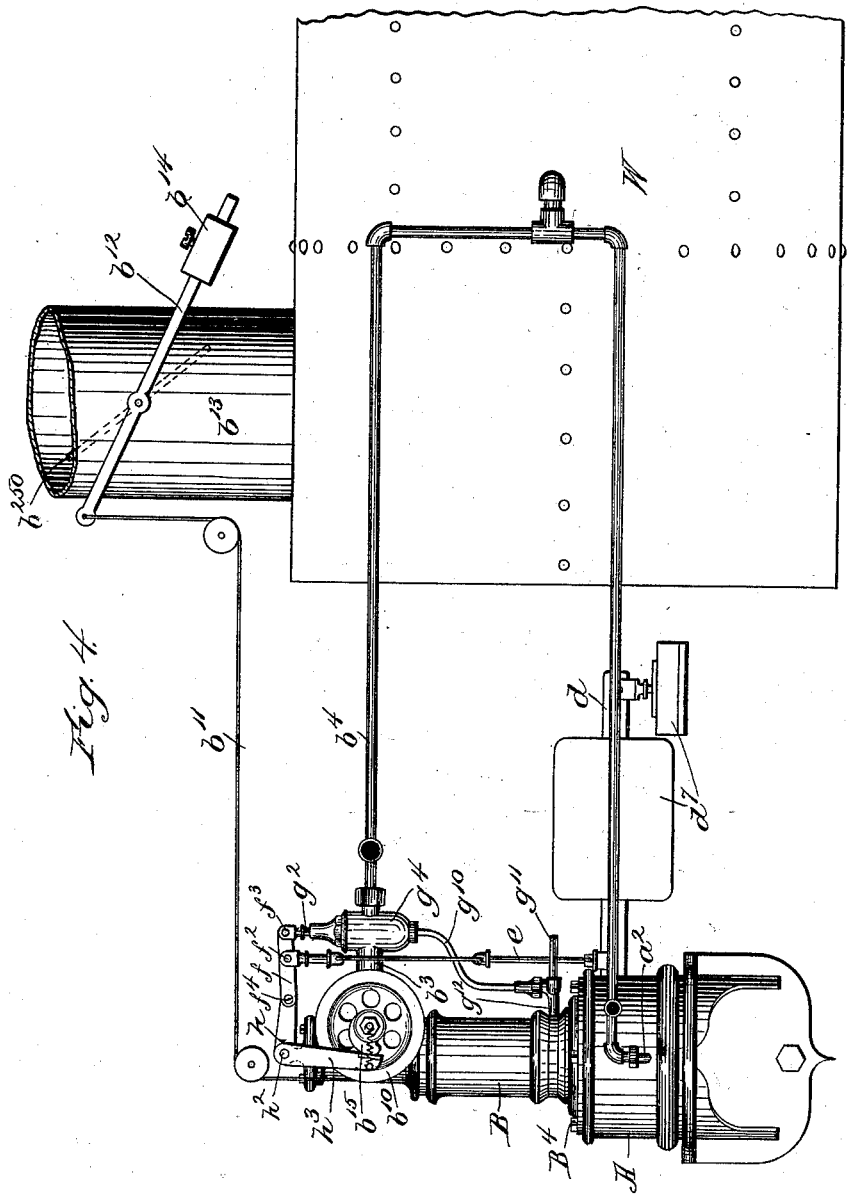

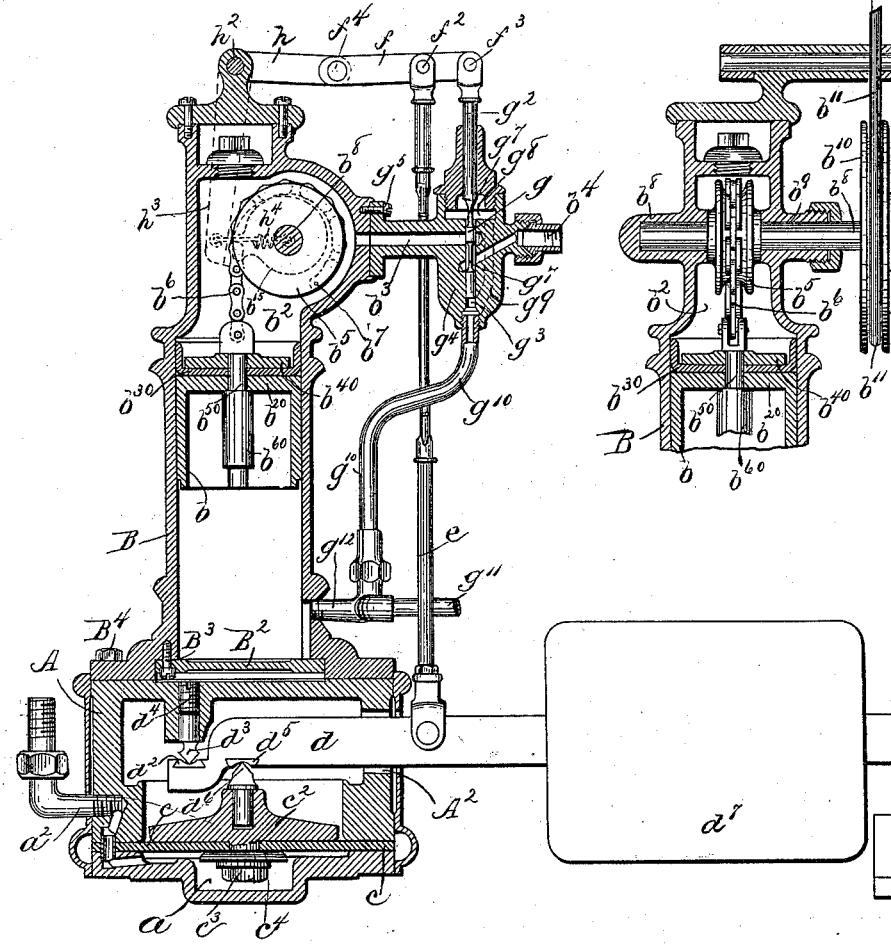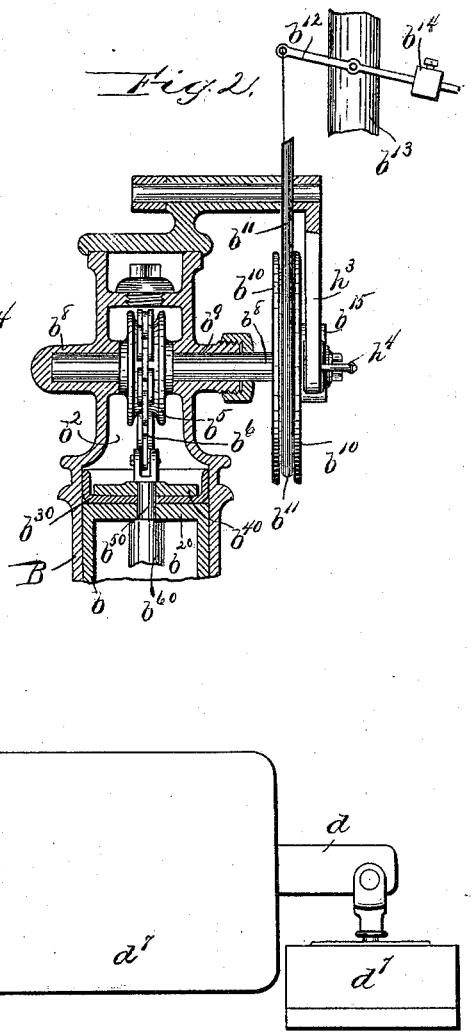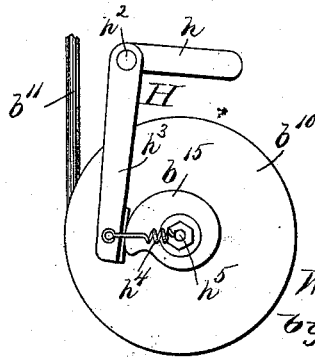

(No Model.)  2 Sheets—Sheet 2.
W. B. MASON.
DAMPER REGULATOR.
No. 561,600. Patented June 9, 1896.

Witnesses
Jas. J. Maloney.
Nancy P. Todd.

Inventor
William B. Mason,
by Jas. P. Livermore
Att'y.

UNITED STATES PATENT OFFICE.

WILLIAM B. MASON, OF BOSTON, MASSACHUSETTS, ASSIGNOR TO THE MASON REGULATOR COMPANY, OF SAME PLACE.

DAMPER-REGULATOR.

SPECIFICATION forming part of Letters Patent No. 561,600, dated June 9, 1896.

Application filed June 25, 1894. Serial No. 515,688. (No model.)

*To all whom it may concern:*

Be it known that I, WILLIAM B. MASON, of Boston, county of Suffolk, State of Massachusetts, have invented an Improvement in Damper-Regulators, of which the following description, in connection with the accompanying drawings, is a specification, like letters on the drawings representing like parts.

The present invention relates to regulators for fluid-pressure generators of that class in which the device is responsive to the pressure generated, the object being to maintain such pressure practically constant under changes in load or variations due to other causes.

The device embodying the invention is intended especially for use with steam-boilers, and when so used operates in accordance with variations in the pressure of the steam contained therein to open or close to a greater or less extent the damper connected with the furnace by which the steam is generated, so that an increase of pressure above a predetermined normal amount will cause the regulator to close or partially close the damper, while a decrease of said pressure will operate conversely to open the said damper.

In the following specification the apparatus will be described as applied to a steam-boiler and operating to control the fire in the furnace whereby the steam is generated, although the invention is not necessarily limited to use in connection with steam, as it might be adapted to control the generation of any fluid-pressure.

The device is primarily operated by a movable diaphragm acted upon directly by the pressure which is to be maintained constant, the movement of said diaphragm responsive to said pressure being transmitted to a valve operating a fluid-pressure motor, preferably a water-motor, mechanically connected to the damper which controls the fire by which the steam is generated, the said damper being normally held open by a suitable force, as that of a weight or spring against which the motor operates to close the said damper. Thus an increase of pressure in the boiler tends to move the diaphragm and open the valve controlling the motor, thus starting the motor and closing the damper. It is preferable, however, that the damper, instead of oscillating between its extremes—that is to say, remaining wholly open or wholly closed when the pressure is below or above the normal points, respectively—should assume a mean position variable with the pressure variation, and for this purpose means are provided for compensating for the movement of the motor, and a mechanical connection is accordingly provided whereby the operation of the motor tends to shift the controlling-valve thereof and stop the said motor before it has wholly closed or opened the damper, as the case may be. In order to obtain this compensating effect, the valve controlling the motor is operated by a lever, which will be hereinafter called the "valve-lever," connected at one point to a second lever, hereinafter called the "main lever," which is operated directly by the diaphragm, and at another point to an arm of a lever hereinafter referred to as the "compensating lever," the said arm being movable in response to the movement of the motor. Thus when the motor-valve is closed and the motor at rest the arm or compensating lever connected to the lever which operates the valve or valve-lever is stationary in a predetermined position and forms a fulcrum for the said valve-lever, so that a movement of the main lever in response to the movement of the diaphragm moves the said valve-lever on said point as a fulcrum, the parts being so arranged that such movement opens the motor-valve. As soon, however, as the motor begins to operate, the compensating lever which first forms the fulcrum of the valve-lever is moved, thus moving the said valve-lever upon the main-lever connection as a fulcrum and tending to close the valve. The point at which the motor stops running, therefore, will be directly responsive to the position assumed by the diaphragm, and the damper will remain in the position best suited to maintain the proper amount of heat in the furnace to keep the pressure in the boiler at the proper point.

Figure 1 is a vertical section of the device, showing the operative parts thereof. Fig. 2 is a transverse section of the upper portion of Fig. 1, showing the motor and its mechanical connection with the damper. Fig. 3 is a detail in elevation of the compensating device; and Fig. 4, a side elevation of the regulating apparatus, showing a sufficient portion of the boiler and furnace-flue and regulating-damper therefor to illustrate the application of the regulating apparatus thereto.

The device consists of a base portion A, in the lower part of which is formed the pressure-chamber $a$, one wall of said chamber consisting of a diaphragm $c$, and having an inlet-passage $a^2$, directly connected to the boiler W, Fig. 4, the pressure of which is to be regulated. The said diaphragm $c$ consists of a disk of flexible material, such as rubber, stretched across the lower portion of the casting A, and is provided with a bearing-piece $c^2$, suitably secured to its upper surface by means of a nut $c^3$, screwed on a stem $c^4$, extending downward from the lower surface of said bearing-piece through an opening in the center of the diaphragm.

In the upper portion of the casting A is mounted the main operating-lever $d$, the upper side of said main lever having a hardened bearing portion $d^2$, engaging with a knife-edge bearing $d^3$, extending downward into the inner portion of the casting A and preferably provided with a follower $d^4$, screwed into an internally-threaded opening in the casting A, so that the knife-edge bearing $d^3$ may be adjusted if necessary. The lower side of the main lever $d$ is also provided with a hardened bearing portion $d^5$, engaging with a knife-edge $d^6$, mounted in the bearing portion $c^2$ of the diaphragm $c$, so that an upward movement of the said diaphragm will tend to rock the said main lever $d$ upward upon the knife-edge bearing $d^3$ as a fulcrum. The bearings $d^3$ and $d^6$ are supported in suitable sockets, in which they are free to rotate, while the bearing-surfaces thereof are concave and cylindrical, the result being that the knife-edges assume a position transverse to the lever, thus affording a bearing having the least possible friction. The said main lever $d$ extends outward through an opening $A^2$ in the casting A, and is provided at its outer end with weights $d^7$, which may be adjusted according to the pressure which it is desired to maintain in the boiler. In order that an increase of pressure in the boiler may operate to close the damper which controls the furnace, the main lever $d$, which, as has been shown, will be lifted by the diaphragm $c$ when the pressure in the chamber $a$ or boiler-pressure increases, is connected by a link $e$ to the valve-operating lever $f$, preferably near the top of the device, by a pivotal joint $f^2$. The said lever $f$ is connected at its outer end by a pivotal connection $f^3$ to the stem $g^2$ of the controlling-valve $g$ for the damper-motor. The said damper-motor consists, mainly, of a cylinder B, preferably mounted on the base portion A, and a piston $b$, fitting in said cylinder, its normal position being near the top thereof. Above the said cylinder is an inlet-chamber $b^2$, connected by a passage $b^3$ to a source of water or other fluid under pressure, the admission of which to the said inlet-chamber is controlled by the valve $g$, above mentioned. As herein shown, the damper-motor and its valve is connected by pipe $b^4$ with the boiler W; but it may be connected with the usual water supply or any other source of fluid under sufficient pressure to actuate the motor or piston. The said chamber is enlarged and suitably shaped to contain a shaft and operating-wheel mounted thereon and connected with the piston, the movement of said shaft in response to the movement of the piston being adapted to operate the damper and at the same time the compensating lever for the valve, as will be hereinafter described.

The valve-lever $f$ before mentioned is connected at its inner end by a pivotal connection $f^4$ to an arm $h$ of a lever, having a pivotal connection $h^2$ at the top of the enlarged portion of the cylinder B, and the said lever constitutes the compensating device and will be hereinafter referred to as the "compensating lever." Thus an increase of pressure acting upon the diaphragm $c$ lifts the main lever $d$, which in turn lifts the valve-lever $f$ upon the connection $f^4$ as a fulcrum, raising the valve $g$ and connecting the inlet-passage $b^3$ to a supply-passage $b^4$, thus admitting water to the chamber $b^2$ of the motor, causing the piston $b$ to descend and rotate a wheel $b^5$, mounted in said chamber, to which wheel the said piston is connected by a belt or chain $b^6$, fastened at $b^7$ to the periphery of said wheel.

The shaft $b^8$, upon which said wheel is mounted, extends outward through its bearings $b^9$, Fig. 2, in the walls of the chamber $b^2$, and is provided with a second wheel $b^{10}$, to the periphery of which is connected a belt or chain $b^{11}$, connected to the damper-operating arm $b^{12}$, which in this case is conventionally shown on a small scale as connected to a damper in the pipe or uptake $b^{13}$ of the furnace, the damper $b^{20}$ itself being shown mainly in dotted lines, Fig. 4. The said damper-operating arm $b^{12}$ is shown as provided with a counterpoise $b^{14}$, the operation of which tends to keep the damper in its wide-open position when not operated upon by the motor.

By the operation of the device as thus far described, without the compensating device, which forms a part of the present invention, an increase of pressure in the boiler above the predetermined normal pressure would start the motor, and the said motor would continue running to the full extent of its movement, or, in other words, immediately close the damper wholly, thus putting the greatest possible check upon the fire, and this condition would exist until the pressure in the boiler again became reduced, allowing the diaphragm to fall and close the motor-valve $g$, upon which the damper would again become wide open by the action of its counterpoise $b^{14}$.

In order to afford a compensating effect and maintain the damper in a mean position instead of allowing it to oscillate between extremes, the compensating lever $h$, Fig. 3, at the end of the arm $h$ of which is the primary fulcrum-point of the lever $f$, is provided with a downwardly-extending arm $h^3$, bearing on the periphery of a cam-shaped wheel $b^{15}$, mounted on the shaft $b^8$, which carries the motor-wheel $b^5$. The said arm $h^3$ is held in contact with the said cam-surface by means of a spring $h^4$, connected to a pin $h^5$ on a fixed portion of the apparatus. Thus as the motor-wheel $b^5$ turns in response to the downward pressure upon the piston $b$ the arm $h^3$ moves to the right, thus rocking the compensating lever on its pivot $h^2$, so that the end of the arm $h$, to which is connected the inner end of the valve-lever $f$, is moved upward, rocking the said valve-lever $f$ upon its pivotal connection $f^2$ with the link $e$, which then becomes the fulcrum of the lever, and thus depressing the stem $g^2$ of the valve $g$, the said valve being thereby closed, so that the motor stops running.

It is obvious that the position assumed by the damper will depend directly upon the position of the pivotal connection $f^2$, which in turn depends upon the position assumed by the diaphragm in response to the boiler-pressure, since the higher the position of said pivotal connection $f^2$ the greater will be the movement of the motor before the elbow-lever has moved through a sufficient distance to close the valve $g$. The valve $g$, with its connections, may be made in any suitable way, and preferably consists, as shown, of a cylindrical plunger fitting a cylindrical bore or passage $g^3$ in a separate casting $g^4$, coupled by means of a bolt or screw $g^5$ to the main casting B, which contains the motor. The said stem is provided with two portions $g^7$, cut down to a smaller diameter than the main portion thereof, so that as the said stem moves up and down across the passage $b^3$, which connects with the passage $g^3$, the said passage is connected either with the inlet-passage $b^4$ or with an exhaust-chamber $g^8$ in the upper portion of the casting $g^4$. Thus as the valve $g$ moves down in response to the decrease of pressure in the boiler the water in the chamber $b^2$ exhausts into the chamber $g^8$ and thence through a downward passage $g^9$ into a pipe $g^{10}$, which is provided with a suitable outlet $g^{11}$, the said pipe $g^{10}$ being also connected with the passage $g^3$, Fig. 1, in order to take the leak from the valve, and by a branch $g^{12}$ with the cylinder of the motor, thus forming a vent or opening therein behind the piston $b$ and also allowing any water that may leak by the said piston to escape. The piston $b$ may also be made in any suitable way, and in this case is shown as consisting of a main cup-shaped casting $b^{20}$, upon the top of which is seated a disk-shaped packing portion $b^{30}$, held in position by a similar disk of metal $b^{40}$, suitably connected to the chain $b^6$. The said disk $b^{40}$ is provided with a downwardly-threaded stem $b^{50}$, upon which is screwed an elongated nut $b^{60}$, the parts being constructed in this manner for convenience in assembling, the nut $b^{60}$ being adjusted by means of a key or wrench inserted through the lower mouth of the cylindrical portion of the casting B. After the motor and its piston are put in place in the cylinder B and its enlarged chamber $b^2$ the lower mouth or opening of the said cylinder is closed by a disk-shaped plate $B^2$, secured thereto by the screws or bolts $B^3$, and the whole motor portion is then secured to the top of the base portion A by means of nuts or cap-screws $B^4$.

While the apparatus has been set forth in detail in the foregoing description in order that the operation thereof may be rendered perfectly clear, it is not intended that the invention should be limited to the exact construction shown, since obvious modifications might be made; nor is it intended to limit the invention specifically to a damper-regulator, since substantially the same means might be employed to regulate the generation of other forms of fluid-pressure.

I claim—

The combination with a fluid-pressure motor comprising a cylinder, piston, and rotating shaft actuated by the latter; of the diaphragm acted upon on one side by fluid-pressure as that of steam in a boiler, and on the other side by a predetermined force as that of a weight or spring; and a valve-lever operatively connected at a point between its extremities to said diaphragm; and a valve connected to said lever and adapted to control the fluid-pressure motor; a compensating device connected to said valve-lever; and an actuating-cam on the rotary shaft of the motor for said compensating device for moving said compensating device and valve in response to the movement of the motor, substantially as described.

In testimony whereof I have signed my name to this specification in the presence of two subscribing witnesses.

WM. B. MASON.

Witnesses:
H. J. LIVERMORE,
M. E. HILL.